United States Patent
Morris

(10) Patent No.: US 7,680,940 B2
(45) Date of Patent: Mar. 16, 2010

(54) METHOD AND SYSTEM FOR MANAGING DYNAMIC ASSOCIATIONS BETWEEN FOLKSONOMIC DATA AND RESOURCES

(75) Inventor: Robert P. Morris, Raleigh, NC (US)

(73) Assignee: Scenera Technologies, LLC, Portsmouth, NH (US)

( * ) Notice: Subject to any disclaimer, the term of this patent is extended or adjusted under 35 U.S.C. 154(b) by 404 days.

(21) Appl. No.: 11/692,626

(22) Filed: Mar. 28, 2007

(65) Prior Publication Data

US 2008/0244051 A1 Oct. 2, 2008

(51) Int. Cl.
G06F 15/173 (2006.01)
G06F 17/00 (2006.01)

(52) U.S. Cl. .......... 709/226; 715/234; 707/200

(58) Field of Classification Search .......... 707/10, 707/5, 104.1, 101, 3, 102, 100, 200; 705/26; 709/226; 715/234
See application file for complete search history.

(56) References Cited

U.S. PATENT DOCUMENTS

| | | | |
|---|---|---|---|
| 6,219,818 B1 | 4/2004 | Frievald et al. | |
| 6,938,042 B2 | 8/2005 | Aboulhosn et al. | |
| 2003/0115187 A1* | 6/2003 | Bode et al. | 707/3 |
| 2003/0135565 A1 | 7/2003 | Estrada | |
| 2005/0234891 A1 | 10/2005 | Walther et al. | |
| 2005/0234957 A1* | 10/2005 | Olson et al. | 707/101 |
| 2006/0010117 A1 | 1/2006 | Bonabeau et al. | |
| 2006/0074980 A1 | 4/2006 | Sarkar | |
| 2007/0016575 A1* | 1/2007 | Hurst-Hiller et al. | 707/5 |
| 2007/0150487 A1* | 6/2007 | Christian et al. | 707/100 |
| 2007/0266032 A1* | 11/2007 | Blumenau | 707/10 |
| 2007/0288514 A1* | 12/2007 | Reitter et al. | 707/104.1 |
| 2008/0010249 A1* | 1/2008 | Curtis et al. | 707/3 |
| 2008/0016098 A1* | 1/2008 | Frieden et al. | 707/102 |
| 2008/0091548 A1* | 4/2008 | Kotas et al. | 705/26 |
| 2008/0228749 A1* | 9/2008 | Brown | 707/5 |

* cited by examiner

Primary Examiner—Jungwon Chang

(57) ABSTRACT

Methods and systems are described for managing dynamic associations between folksonomic data and resources. One method includes receiving from a subscriber a subscription request to establish at least one of a first subscription to tag/resource association data associated with a resource and a second subscription to tag/resource association data associated with a folksonomic tag, wherein the folksonomic tag is unstructured metadata that includes a user-defined character string and establishing at least one of the first subscription and the second subscription. The method further includes determining a change to the tag/resource association data associated with at least one of the folksonomic tag and the resource identified in the subscription request, generating a notification message including at least one of an identifier of the folksonomic tag and an identifier of the resource in response to determining the change to the tag/resource association data associated with at least one of the folksonomic tag and the resource, and sending the notification message to the subscriber pursuant to at least one of the first subscription and the second subscription.

27 Claims, 6 Drawing Sheets

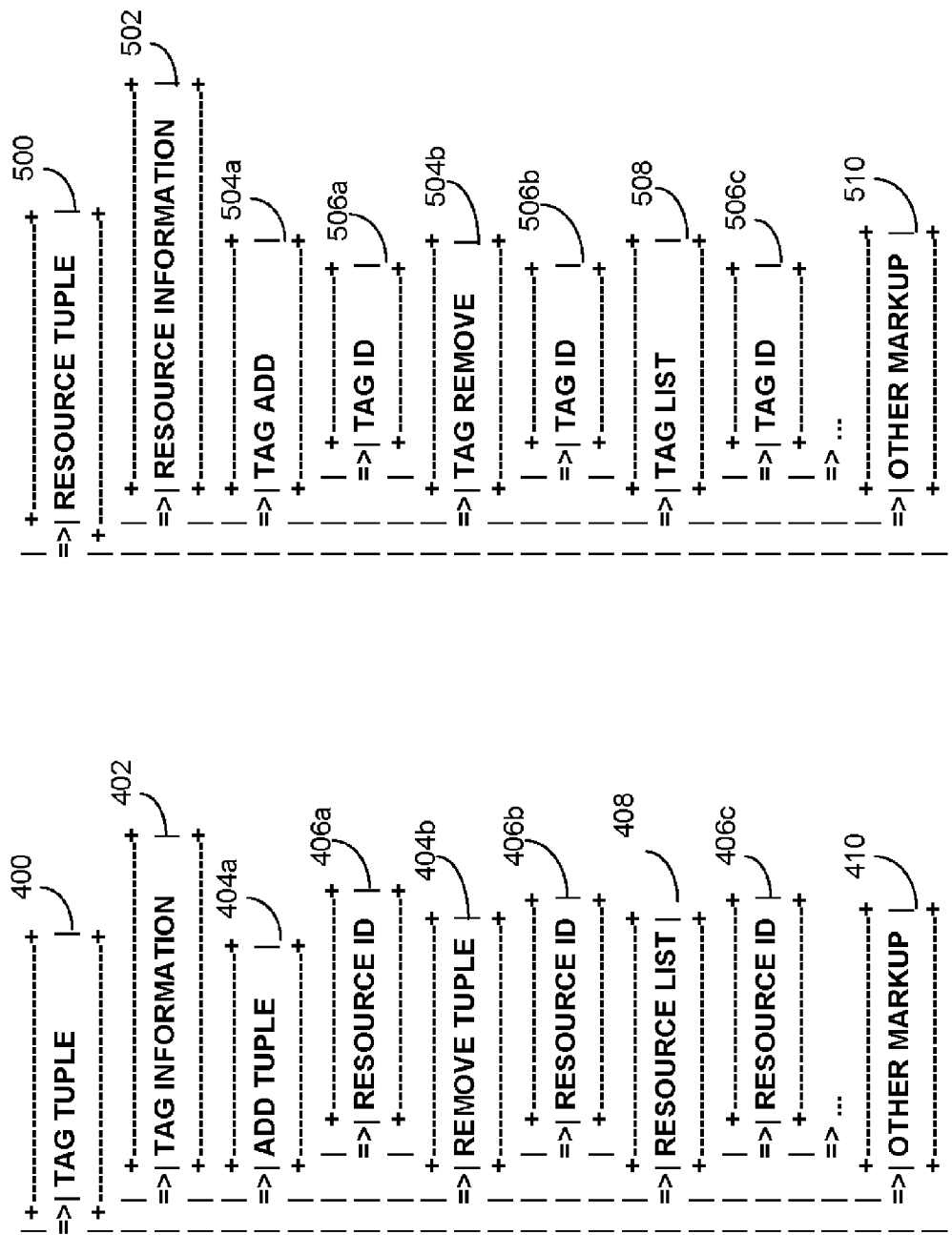

METHOD AND SYSTEM FOR MANAGING DYNAMIC ASSOCIATIONS BETWEEN FOLKSONOMIC DATA AND RESOURCES

COPYRIGHT NOTICE

A portion of the disclosure of this patent document contains material which is subject to copyright protection. The copyright owner has no objection to the facsimile reproduction by anyone of the Patent and Trademark Office patent file or records, but otherwise reserves all copyright rights whatsoever.

BACKGROUND

The term folksonomy refers to an Internet-based information retrieval methodology that uses collaboratively generated, open-ended labels that categorize resources, such as images, video clips, web pages, books, and the like. A folksonomy allows a user of a resource, e.g., an originator or a viewer, to create a label and to associate the label with the resource. The label, which is commonly referred to as a folksonomic tag ("tag"), is typically unstructured metadata that includes a user-defined character string that reflects the user's interpretation of the resource. Because folksonomic tags are user-created, they can, in some instances, more accurately describe the resource, e.g., when the user (tagger) is very familiar with the resource. Furthermore, because folksonomic tags reflect, to some degree, the tagger's viewpoint or perspective, other users who share the same or similar perspective can explore other resources tagged by the tagger.

Several web-based services currently allow users to provide folksonomic tags to resources hosted by the services and/or resources hosted by other services. One problem, however, is that in order to determine a resource's folksonomic tag(s), the resource must be known and accessed. Similarly, in order to find resources related to a tag, a search for those resources must be performed using the particular tag information. Another problem with current services that utilize folksonomic tags is that the association between a resource and a folksonomic tag is static. That is, once a tag is assigned to a resource, that association is persistent. Accordingly, folksonomic tags generally cannot be associated with resources that change dynamically, e.g., resources associated with presence or publish/subscribe data, because the tags do not change dynamically.

Accordingly, there exists a need for methods, systems, and computer program products for providing dynamic access to folksonomic data associated with a resource as the resource changes and providing access to resources as their associated folksonomic data change.

SUMMARY

Methods and systems are described for managing dynamic associations between folksonomic data and resources. One method includes receiving from a subscriber a subscription request to establish at least one of a first subscription to tag/resource association data associated with a resource and a second subscription to tag/resource association data associated with a folksonomic tag, wherein the folksonomic tag is unstructured metadata that includes a user-defined character string and establishing at least one of the first subscription and the second subscription. The method further includes determining a change to the tag/resource association data associated with at least one of the folksonomic tag and the resource identified in the subscription request, generating a notification message including at least one of an identifier of the folksonomic tag and an identifier of the resource in response to determining the change to the tag/resource association data associated with at least one of the folksonomic tag and the resource, and sending the notification message to the subscriber pursuant to at least one of the first subscription and the second subscription.

In another aspect of the subject matter disclosed herein, another method for managing dynamic associations between folksonomic data and resources includes generating a message including a subscription request to subscribe to at least one of a change in tag/resource association data associated with a resource and a change in tag/resource association data associated with a folksonomic tag, wherein the folksonomic tag is unstructured metadata that includes a user-defined character string and the request includes information identifying at least one of the resource and the folksonomic tag. The method further includes sending the message to a subscription service via a network, and receiving, pursuant to the subscription request, a notification message based on at least one of changed tag/resource association data associated with the resource and changed tag/resource association data associated with the folksonomic tag.

In another aspect of the subject matter disclosed herein, a system for managing dynamic associations between folksonomic data and resources includes a network protocol stack component configured for receiving and sending information over a network and a subscription service communicatively coupled to the network stack component. The subscription service includes a subscription handler component configured for receiving from a subscriber via the network a subscription request to establish at least one of a first subscription to tag/resource association data associated with a resource and a second subscription to tag/resource association data associated with a folksonomic tag, wherein the folksonomic tag is unstructured metadata that includes a user-defined character string, and configured for establishing at least one of the first subscription and the second subscription, and an association handler component configured for determining a change to the tag/resource association data associated with at least one of the folksonomic tag and the resource identified in the subscription request. The subscription service further includes a notification handler component configured for generating a notification message including at least one of an identifier of the folksonomic tag and an identifier of the resource in response to determining the change to tag/resource association data associated with at least one of the folksonomic tag and the resource, and for sending the notification message via the network to the subscriber pursuant to at least one of the first subscription and the second subscription.

In another aspect of the subject matter disclosed herein, another system for managing dynamic associations between folksonomic data and resources includes means for receiving from a subscriber a subscription request to establish at least one of a first subscription to tag/resource association data associated with a resource and a second subscription to tag/resource association data associated with a folksonomic tag, wherein the folksonomic tag is unstructured metadata that includes a user-defined character string, and for establishing at least one of the first subscription and the second subscription, and means for determining a change to the tag/resource association data associated with at least one of the folksonomic tag and the resource identified in the subscription request. The system further includes means for generating a notification message including at least one of an identifier of the folksonomic tag and an identifier of the resource in response to determining the change to the tag/resource association data associated with at least one of the folksonomic tag and the resource, and for sending the notification message to the subscriber pursuant to at least one of the first subscription and the second subscription.

In another aspect of the subject matter disclosed herein, a computer readable medium containing a computer program, executable by a machine, for managing dynamic associations between folksonomic data and resources is disclosed. The computer program comprises executable instructions for receiving from a subscriber a subscription request to establish at least one of a first subscription to tag/resource association data associated with a resource and a second subscription to tag/resource association data associated with a folksonomic tag, wherein the folksonomic tag is unstructured metadata that includes a user-defined character string, establishing at least one of the first subscription and the second subscription, determining a change to the tag/resource association data associated with at least one of the folksonomic tag and the resource identified in the subscription request, generating a notification message including at least one of an identifier of the folksonomic tag and an identifier of the resource in response to determining the change to the tag/resource association data associated with at least one of the folksonomic tag and the resource, and sending the notification message to the subscriber pursuant to at least one of the first subscription and the second subscription.

In another aspect of the subject matter disclosed herein, a computer readable medium containing a computer program, executable by a machine, for managing dynamic associations between folksonomic data and resources comprises executable instructions for generating a message including a subscription request to subscribe to at least one of a change in tag/resource association data associated with a resource and a change in tag/resource association data associated with a folksonomic tag, wherein the folksonomic tag is unstructured metadata that includes a user-defined character string and the request includes information identifying at least one of the resource and the folksonomic tag, sending the message to a subscription service via a network, and receiving, pursuant to the subscription request, a notification message based on at least one of the changed tag/resource association data associated with the resource and the changed tag/resource association data associated with the folksonomic tag.

BRIEF DESCRIPTION OF THE DRAWINGS

Objects and advantages of the present invention will become apparent to those skilled in the art upon reading this description in conjunction with the accompanying drawings, in which like reference numerals have been used to designate like elements, and in which:

FIG. 4 illustrates an exemplary tuple structure supporting tag/resource association data according to an exemplary embodiment;

FIG. 5 illustrates another exemplary tuple structure supporting tag/resource association data according to another exemplary embodiment;

DETAILED DESCRIPTION

Methods, systems, and computer program products for managing dynamic associations between folksonomic tags and resources are disclosed. In this description, a folksonomic tag is unstructured metadata that includes a user defined character string. For example, a folksonomic tag can be a word, such as "car," or it can be a phrase, such as "1955 Chevy Impala." Moreover, a resource, in this description, refers to any network accessible resource that can have a folksonomic tag associated with it. For example, resources include media resources, e.g., image data including video, audio data, documents, messages, e.g., email and MMS, web pages, account information, presence information, devices, software and hardware components, transactions and other short-lived resources.

According to one embodiment, a subscription service provides notifications of changes in an association between a resource and a folksonomic tag to interested clients of the resource. An interested client either has a subscription for receiving notifications or the subscription service is directed to send a notification to the client in some other manner. Similarly, the subscription service can also provide notifications of changes in an association between a folksonomic tag and a resource to interested clients of the folksonomic tag. For example, when a new folksonomic tag is associated with a resource or when an existing folksonomic tag associated with the resource is removed, the interested client of the resource can be notified of the change in the association.

In one embodiment, the subscription service can send asynchronous notifications to clients who subscribe to receive changes relating to a resource and/or a folksonomic tag. For example, a publish/subscribe (pub/sub) communication protocol can be used to send asynchronous notifications. In other embodiments, the subscription service can send notifications using traditional store and forward queuing services, such as electronic mail, as well as traditional Get-Request services, such as RSS. A notification can include only the most recent change, in one embodiment, or can include changes queued and stored for the subscriber when the subscriber is offline or otherwise unsubscribed. In this case, when a subscriber logs on or subscribes to the subscription service, the subscriber can receive the current state of the information, as well as previous updates that may have occurred while the subscriber was offline or unsubscribed.

Figure 1:
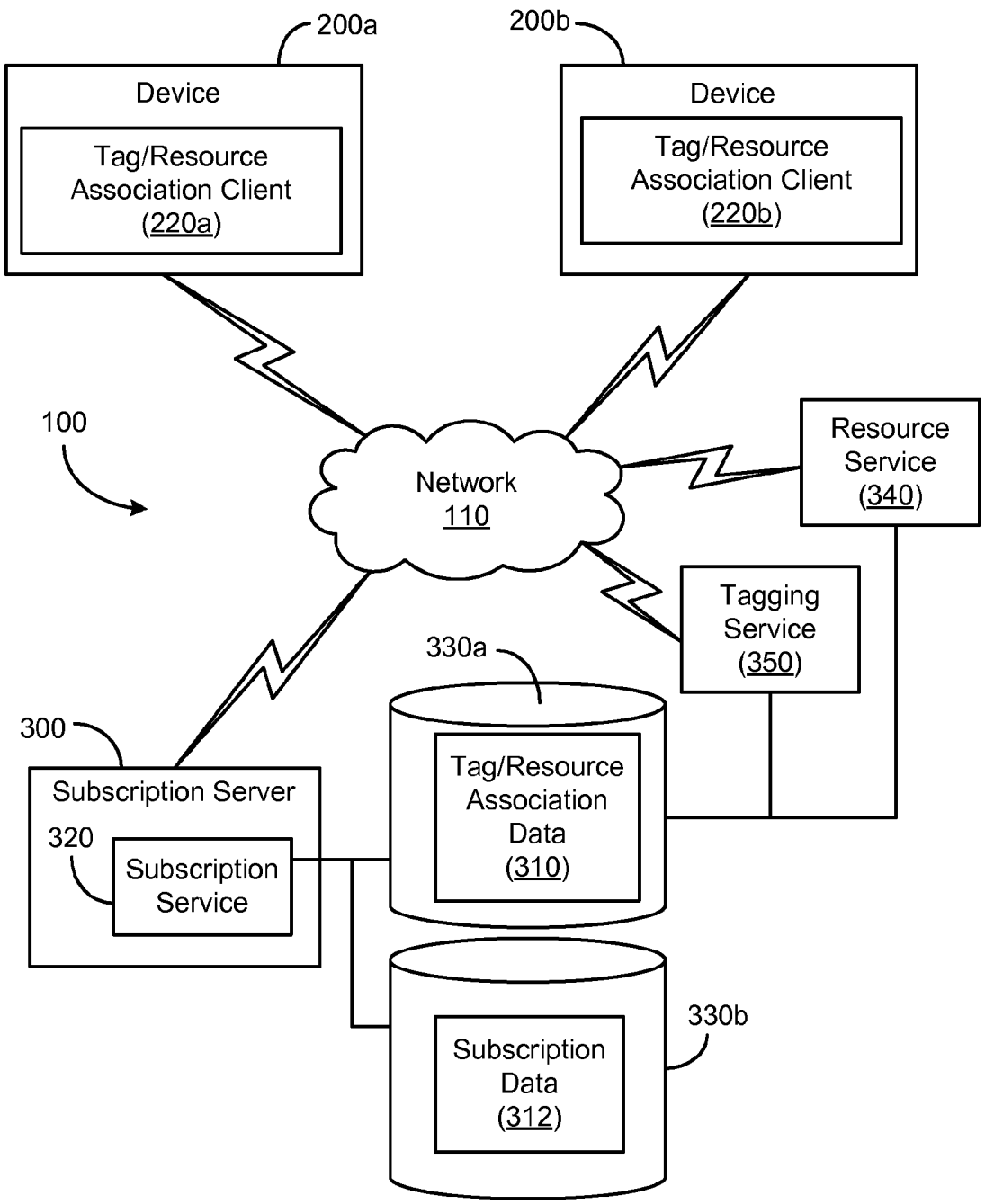
FIG. 1 is a block diagram illustrating an exemplary system for managing dynamic associations between folksonomic data and resources according to an exemplary embodiment.

FIG. 1 is a block diagram illustrating an exemplary system according to one embodiment. The system 100 includes a plurality of devices 200a, 200b communicatively coupled to a subscription server 300 by a network 110. The network 110 may be a Local Area Network (LAN) and/or a Wide Area Network (WAN) including the Internet. The subscription server 300 includes, in an exemplary embodiment, a subscription service 320 that manages and stores tag/resource association data 310 and subscription data 312 in one or more data stores 330a, 330b. In an alternate embodiment, the subscription service 320 monitors tag/resource association data 310 managed, for example, by a resource service 340 and/or a tagging service 350. Tag/resource association data 310 includes, in one embodiment, information identifying one or more folksonomic tags associated with a resource and/or information identifying one or more resources associated with a folksonomic tag. Subscription data 312 can include information identifying one or more clients subscribed to a resource and/or subscribed to a folksonomic tag.

In one embodiment, each device 200a, 200b includes a tag/resource association client 220a, 220b. Each device 200a, 200b provides, for example, (not shown) a processor, operating system or control program, a network subsystem, input/output subsystems, and memory subsystems in order to provide an operating environment allowing the tag/resource association client 220a, 220b to operate.

Figure 2:
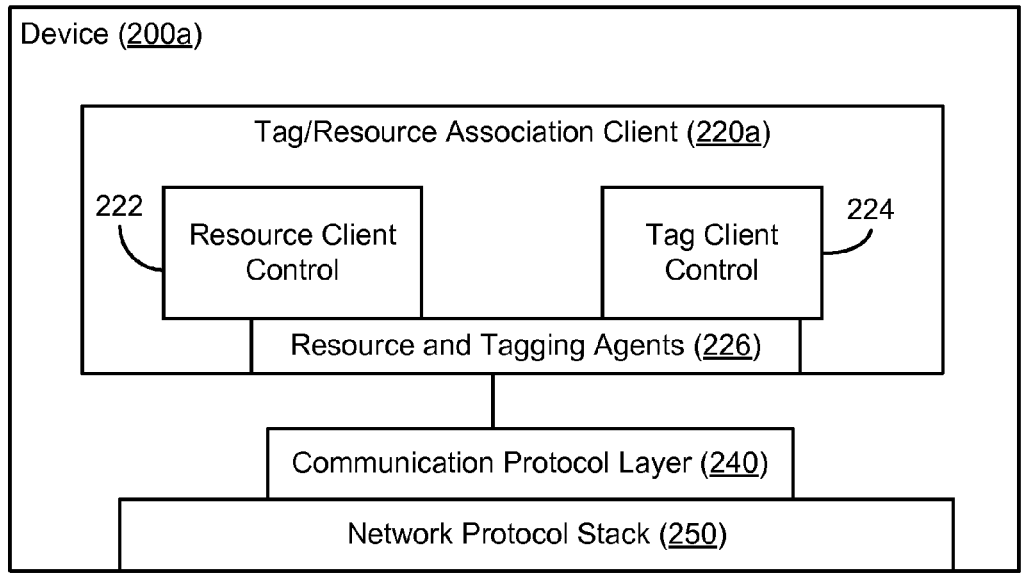
FIG. 2 is a block diagram illustrating an exemplary device according to an exemplary embodiment.

FIG. 2 is a block diagram showing an exemplary device 200a according to one embodiment. Referring to FIG. 1 and FIG. 2, the tag/resource association client 220a, in one embodiment, includes a resource client control component 222 for monitoring resources and a tag client control component 224 for monitoring tags. The resource client control component 222 can be used to send and receive subscription requests and notifications, respectively associated with a resource to and from the subscription service 320 in the subscription server 300.

Optionally, the resource control client can be used for communicating with the resource service 340 for managing the resource. For example, a user can use the resource client control component 222 to send a request to the resource service 340 to create or change an association between a folksonomic tag and the resource. The resource service 340 then updates the tag/resource association data 310 in the data store 330a or requests the subscription service 320 to do so. Similarly, a user can use the tag client control component 224 to send and receive information associated with a folksonomic tag to the tagging service 350. For example, a user can use the tag control component 224 to send a request to create or change an association between a resource and the folksonomic tag to the tagging service 350. The tagging service 350 then updates the tag/resource association data 310 in the data store 330a or requests the subscription service 320 to do so. In an embodiment, the resource service 340, the tagging service 350, and the subscription service 320 can be provided by the same provider as an integrated service. In other embodiments, the resource service 340 and tagging service 350 can be integrated but separate from the subscription service 320, or all three services 320, 340, 350 can be separately implemented and operated.

In one embodiment, the subscription service 320 can be a pub/sub service and the tag/resource association client 220a can use a pub/sub protocol when communicating with the subscription service 320. A tag/resource association client 220a can use a watcher component (not shown) to subscribe to information associated with tag/resource association changes. In addition, the resource 340 and/or tagging service 350, in such an embodiment, can also support a pub/sub protocol allowing the tag/association client 220a to use a presentity component (not shown) to publish information associated with a folksonomic tag and/or information associated with a resource to the subscription service 320.

In the embodiment shown in FIG. 2, the resource client control component 222 and the tag client control component 224 are depicted as separate components in the device 200a. In another embodiment, they can be integrated into one single component. In yet another embodiment, they can be separated completely and residing in different devices 200a, 200b.

Other configurations are possible and the scope of the subject matter described herein is not limited to the configuration shown in FIG. 2.

Figure 3:
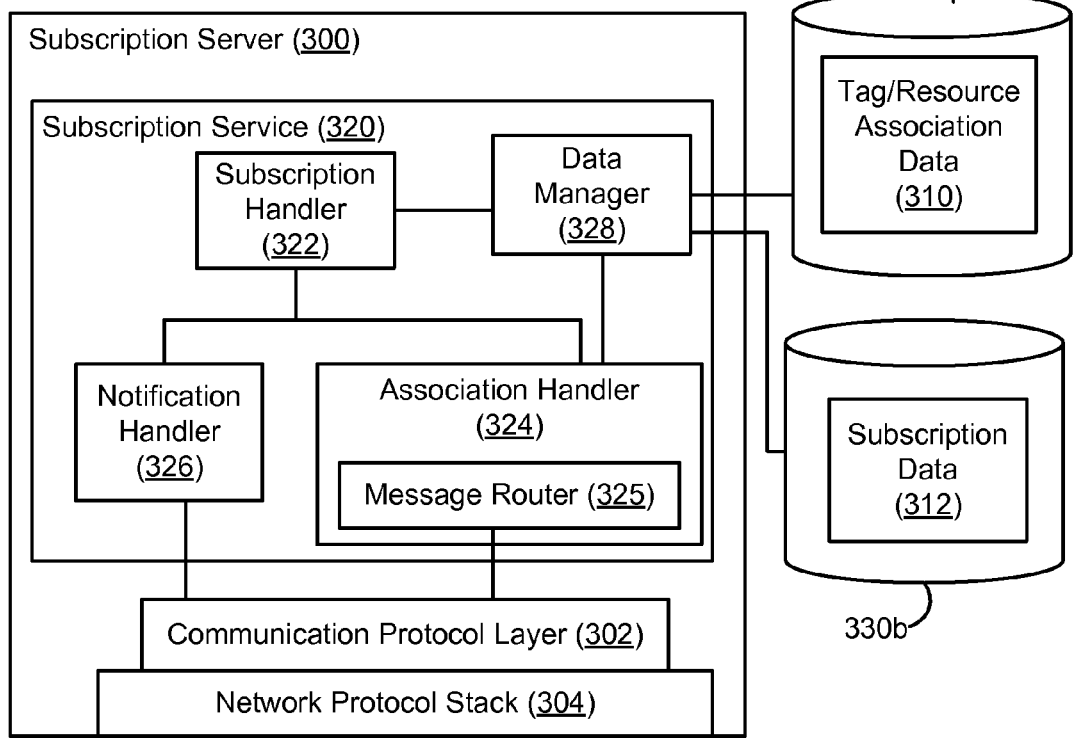
FIG. 3 is a block diagram illustrating an exemplary subscription server according to an exemplary embodiment.

FIG. 3 is a block diagram illustrating an exemplary subscription server 300 that includes the subscription service 320 according to one embodiment. As stated above, the subscription service 320, in an embodiment manages and stores tag/resource association data 310 and subscription data 312 in the data store 330. In one exemplary embodiment, at least one of the data stores 330a, 330b can be a relational database that includes a plurality of tables for storing the tag/resource association data 310 and subscription data 312. For example, in one embodiment, the tag/resource association data 310 can be stored in at least one of a resource table that includes a resource identifier column for identifying a resource record and includes a tag identifier column for linking the resource record to a tag record stored in a tag table, a tag table that includes a tag identifier column for identifying a tag record and includes a resource identifier for linking the folksonomic tag record to a resource record in a resource table, and a tag/resource association table that includes columns for a tag identifier and a resource identifier for identifying a row in a tag table associated with a row in a record table, respectively, in a record of the tag/resource association table. In addition, the subscription data 312 can be stored in a subscriber table that includes a subscriber identifier column for identifying a subscriber record and at least one of a tag identifier column and a resource identifier column for associating the subscriber record with at least one of a tag record and a resource record. One skilled in the art can see that other data models can be used that serve similar purposes.

In another exemplary embodiment, the storage format of the tag/resource association data 310 can be provided by a plurality of data tuples in the data store 330a. A tuple, in its broadest sense, is a data object containing one or more elements, any of which can be used to store and/or transmit information. The tuple can be a representation that maps field names to certain values to indicate that an entity or object includes certain components, information, and/or perhaps has certain properties.

In one embodiment, the tag/resource association data 310 associated with a tag included in a notification message can be included as a tag tuple, such as that shown in FIG. 4. The tag tuple 400 can include a tag information element 402 that identifies the folksonomic tag or information identifying the tag, e.g., a tag identifier. A notification can include all or only a portion of information indicating a change or changes associated with a tag. Change elements 404a, 404b are supported, in some embodiments, for allowing clients to specify tag-resource association changes as well as for notifying subscribers of changes. For example, in one embodiment, an add tuple change element 404a can be included in a notification for indicating an association between the tag and a resource identified by a resource ID element 406a has been created. That is, the tag has been used to annotate the identified resource. Similarly, a remove tuple change element 404b can be used to indicate the removal or deletion of an existing association between the tag identified by the tag information element 402 and a resource identified by a resource ID element 406b included in the remove tuple command element 404b. Thus, a watcher of the identified tag can be notified when the tag is used in a new association with a resource and when an existing association including the tag has been removed. In an embodiment, the tag tuple 400 can include zero or more of the change elements based on actual detected changes.

In addition, the tag tuple 400 can include a resource list element 408 that identifies existing associations. Information included in the resource list element 408 can be sent in a first notification after a subscription has been established to provide a subscriber with a current state of all the associations in which the tag is included. The list element 408 can be sent periodically if there is a possibility that a subscriber can miss notifications. In one embodiment, the resource list element 408 can be used in addition to change elements 404a, 404b or instead of change elements 404a, 404b. When used instead of change elements 404a, 404b, differences between resource list elements 408 of notifications can be used to determine specific tag-resource association changes.

The resource list element 408 can be used as a format for persistent storage and/or processor memory storage identifying current associations between the tag identified by the tag information element 402 and resources identified by any resource ID elements 406c included in the resource list element 408. One skilled in the art can see that numerous other tuple formats can be used and that any tag tuple format can be made extensible as illustrated by the other markup element 410.

For instance, in another exemplary embodiment, the tag/resource association data 310 associated with a resource can be included in a notification using a format such as an exemplary resource tuple 500 shown in FIG. 5. As with the tag tuple 400 format, the resource tuple 500 includes a resource information element 502 that includes the resource or information identifying the resource, such as a resource identifier. Change elements 504a, 504b are supported, in some embodiments, for allowing notifications to specify tag-resource association changes. For example, the resource tuple 500 includes a tag add change element 504a for including in a tuple in a notification for indicating that an association between the resource and a tag identified using a tag ID element 506a has been created. Similarly, a tag remove change element 504b can be provided in a resource tuple in a notification for indicating a removal or deletion of an existing association between a tag identified by a tag ID element 506b included in the tag remove change element 504b and the resource identified in the resource information element 502. Similar to the exemplary tag tuple 400, the resource tuple 500 can include a tag list element 508 identifying current resource-tag associations of the identified resource. The tag list element 508 can be used in addition to change elements 504a, 504b or instead of change elements 504a, 504b. The tag list element 508 can also be used as a storage format for the resource tuple analogous to the use of the resource list element 408 described previously.

According to an exemplary embodiment, the subscription service 320 receives and sends tag/resource association data 310 from and to the plurality of devices 200a, 200b via the network 110. The subscription service 320 can also manage subscriptions to changes in the tag/resource association data 310 and is configured to generate and send notifications of changes to the tag/resource association data 310 to subscribers. In this manner, clients 220a, 220b can subscribe to changes in a tag/resource association and can be notified when the association between a folksonomic tag and a resource is created, removed or otherwise changed.

As indicated above, in another embodiment the subscription service 320 monitors tag/resource association changes managed by another service, such as the resource service 340 and/or the tagging service 350. When the subscription service 320 determines a change to a tag/resource association, the subscription service 320 sends a notification to a subscriber of the tag and/or the resource included in the changed association.

Figure 6:
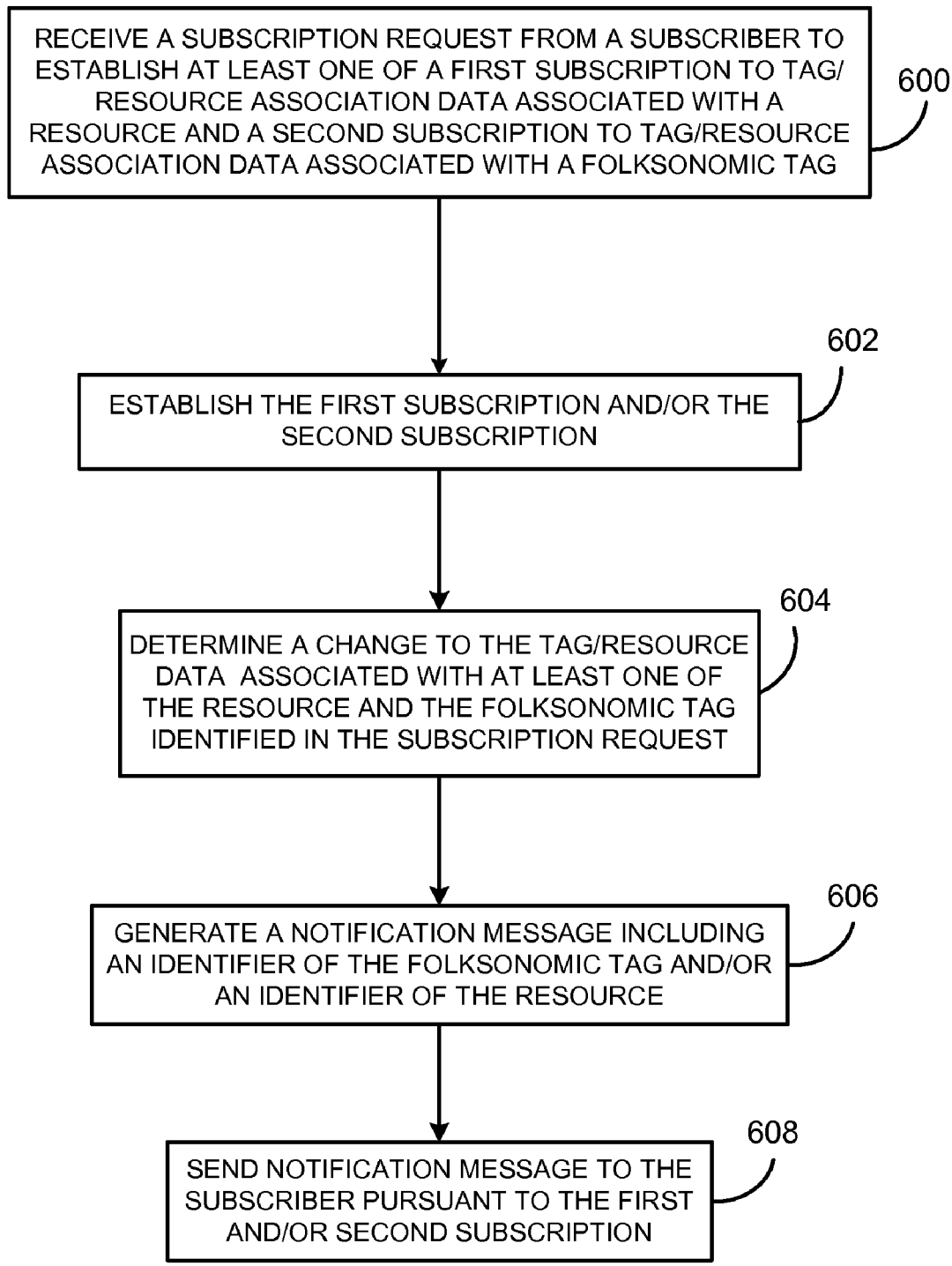
FIG. 6 is a flowchart illustrating a method of managing dynamic associations between folksonomic data and resources according to an exemplary embodiment.

FIG. 6 is a flowchart of an exemplary method for managing dynamic associations between folksonomic data and resources according to one embodiment. According to the exemplary method, the subscription service 320 receives a subscription request from a subscriber to establish at least one of a first subscription to tag/resource association data 310 associated with a resource and a second subscription to tag/resource association data 310 associated with a folksonomic tag, where the folksonomic tag is unstructured metadata that includes a user-defined character string (block 600). The subscriber can be a user of the tag/resource association client 220a, a software and/or hardware component of the device 200a, including the tag/resource association client 220a, and/or a user, software, and/or hardware associated with another device 200b. Once the subscription request is received, at least one of the first subscription and the second subscription is established (block 602).

According to one embodiment, the subscription service 320 includes means for receiving the subscription request from the subscriber and means for establishing the first subscription and/or the second subscription for the subscriber. For example, in one embodiment, the subscription service 320 can include a subscription handler component 322 configured to receive the subscription request from the subscriber and to establish the first and/or second subscriptions.

In one embodiment, the subscription handler component 322 receives the subscription request via an association handler component 324 of the subscription service 320. In this embodiment, the subscription request from the subscriber is received by the association handler component 324 via a network stack 304, which routes the request to a communication protocol layer 302 supported by the subscription service 320. The communication protocol layer 302 then passes the request to a listening message router 325 in the association handler component 324, which determines that the request is a subscription request and, as a result, passes the request to the subscription handler component 322. In another exemplary embodiment, the message router 325 is external to the association handler component 324. In this embodiment, when the message router 325 determines that the request includes a subscription request, it passes the subscription request to the subscription handler component 322 directly.

According to an exemplary embodiment, the subscription handler component 322 receives the subscription request and can establish the first subscription and/or second subscription based on the content of the subscription request. For example, the subscription request can include an identifier of a folksonomic tag and/or a resource, which can then be used to identify a corresponding tag record, resource record, tag tuple and/or a resource tuple. According to one embodiment, the first subscription is for changes to the tag/resource association data 310 associated with the identified resource and the second subscription is for changes to the tag/resource association data 310 associated with the identified tag.

In one embodiment, the subscription handler component 322 can create a subscription list for each of the identified tag tuple and/or resource tuple and place the subscriber on one or both lists. In some embodiments, the subscription request can identify other subscribers that may or may not be associated with the device 200a from which the subscription request is received. Accordingly, those subscribers can also be placed on one or both subscription lists. The subscription handler component 322 can use a data manager component 328 to store the subscription list(s) and other subscription data 312 in the data store 330b, as shown in FIG. 3, or in a separate local or remote data store (not shown).

In an example, after the first subscription and/or second subscription is established and an initial notification is sent with data current at the time of the establishment of the subscription(s), the subscription service 320 determines a change to the tag/resource association data 310 associated with at least one of the resource and the folksonomic tag identified in the subscription request (block 604). The change can be determined via communication with the resource service 340 and/or the tagging service 350 by the subscription service 320, or by the subscription service 320 receiving a change message including a request to change the tag/resource association data 310. In one embodiment, the determined change can be for creating tag/resource association data 310, or for removing or updating existing tag/resource association data 310. Determining the change includes determining an identifier of the folksonomic tag identified in the subscription request or an identifier of the resource identified in the subscription request. The identifier can be included in the change message. The change message format can be compatible with the formats described in conjunction with use of the tag tuple 400 and the resource tuple 500.

According to one embodiment, the subscription service 320 includes means for determining the change to the tag/resource association data 310 associated with at least one of the resource and the folksonomic tag. For example, the association handler component 324 can be configured to receive the change message including the change request. In one embodiment, the change message can be received by the association handler component 324 via the network stack 304, the communication protocol layer 302, and the message router 325. In an alternate embodiment, the resource service 340 and/or the tagging service 350 can receive the change message and send the change message including the change request to the subscription service 320 where it is received by the association handler component 324 via the network stack 304, the communication protocol layer 302, and the message router 325. The change message identifies the tag/association change and the resource and the tag involved.

In an embodiment where determining the change includes the association handler component 324 receiving the change message, the association handler component 324 is configured to change the tag/resource association data 310 associated with the folksonomic tag and/or the resource, thus determining the change. For example, when the change is to create tag/resource association data 310, the association handler component 324 can generate a tag tuple compatible with the tag tuple 400 format as previously described or any other suitable format for the identified folksonomic tag and/or a resource tuple compatible with the resource tuple 500 format as previously described or any other suitable format for the identified resource, and use the data manager 328 to store the tuple 400, 500 in the data store 330. In another embodiment, when the change is to modify existing tag/resource association data 310, the association handler component 324 can use the data manger 328 to update the information in an existing tag tuple 400 and/or to update the information in an existing resource tuple 500, or to update information in the tag/resource association table.

Determining the change associated with the folksonomic tag and/or the resource results in the generation of a notification message that includes at least one of an identifier of the folksonomic tag and an identifier of the resource (block 606). According to an exemplary embodiment, the notification message can also include information indicating how the tag/resource association data 310 was changed, and can be formatted as a tag tuple compatible with the user of tag tuple format 400 or as a resource tuple compatible with resource tuple format 500. Once generated, the notification message is sent to the subscriber via the network 110 pursuant to at least one of the first subscription and the second subscription (block 608).

In an exemplary embodiment, the subscription service 320 includes a means for generating the notification message and sending the notification message to the subscriber. For example, the subscription service 320 can include a notification handler component 326 configured to generate the notification message including the identifier of the folksonomic tag and/or the identifier of the resource and to send the notification message to the subscriber pursuant to at least on of the first subscription and the second subscription.

In one embodiment, the notification handler component 326 can be invoked by the subscription handler component 322 to generate and send the notification message. For example, when the association handler component 324 or the data manager 328 determines the change, either component can notify the subscription handler component 322 of the change in one embodiment. In response, the subscription handler component 322 can retrieve subscription data 312 and identify an active subscription to the tag/resource association data 310 associated with the resource (e.g., the first subscription) and/or the data 310 associated with the tag (e.g., the second subscription). When the subscriber is identified, the subscription handler component 322 can direct the notification handler component 326 to generate and send the notification message including the identifier of the folksonomic tag and/or the identifier of the resource to the subscriber pursuant to the first subscription and/or the second subscription.

In another embodiment, the notification handler component 326 can be invoked by the association handler component 324 when the change message includes a command to send a notification of the changed tag/resource association data 310 directly to a specific recipient or when the change message is received from a service 340, 350 managing the change. For example, the change message can be in the form of a directed publish/notify command that includes an identifier of the recipient to be notified. When such a command is used, the association handler component 324 can direct the notification handler component 326 to generate and send a second (e.g., a directed) notification message to the identified recipient. The directed notification message can also include the identifier of the folksonomic tag and/or the identifier of the resource.

In other embodiments, the notification handler component 324 can be configured to receive a message including a fetch/poll request for tag/resource association data 310 associated with at least one of a resource and a folksonomic tag. The notification handler component 324 can generate and send the requested notification message over the network 110 to a watching or requesting entity using any supported communication protocol, such as a pub/sub protocol.

The association handler component 324, shown in FIG. 3 and described above, can be configured to receive the subscription request to establish first and/or second subscriptions to the tag/resource association data 310 associated with the resource and/or the folksonomic tag, and to receive and process the change message including the request to change the tag/resource association data 310 associated with the resource and/or the folksonomic tag. In one embodiment, the association handler component 324 can include at least one of the resource service 340 and the tagging service 350. In other embodiments, a first association handler component 324 comprising a resource service 340 can be implemented in a first subscription service 320 and a second association handler component 324 comprising a tagging service 350 can be implemented in a second subscription service 320. In this manner the function of the association handler component 324 can be centralized in one service 320 of server 300, or distributed over several services 320 and servers 300.

Figure 7:
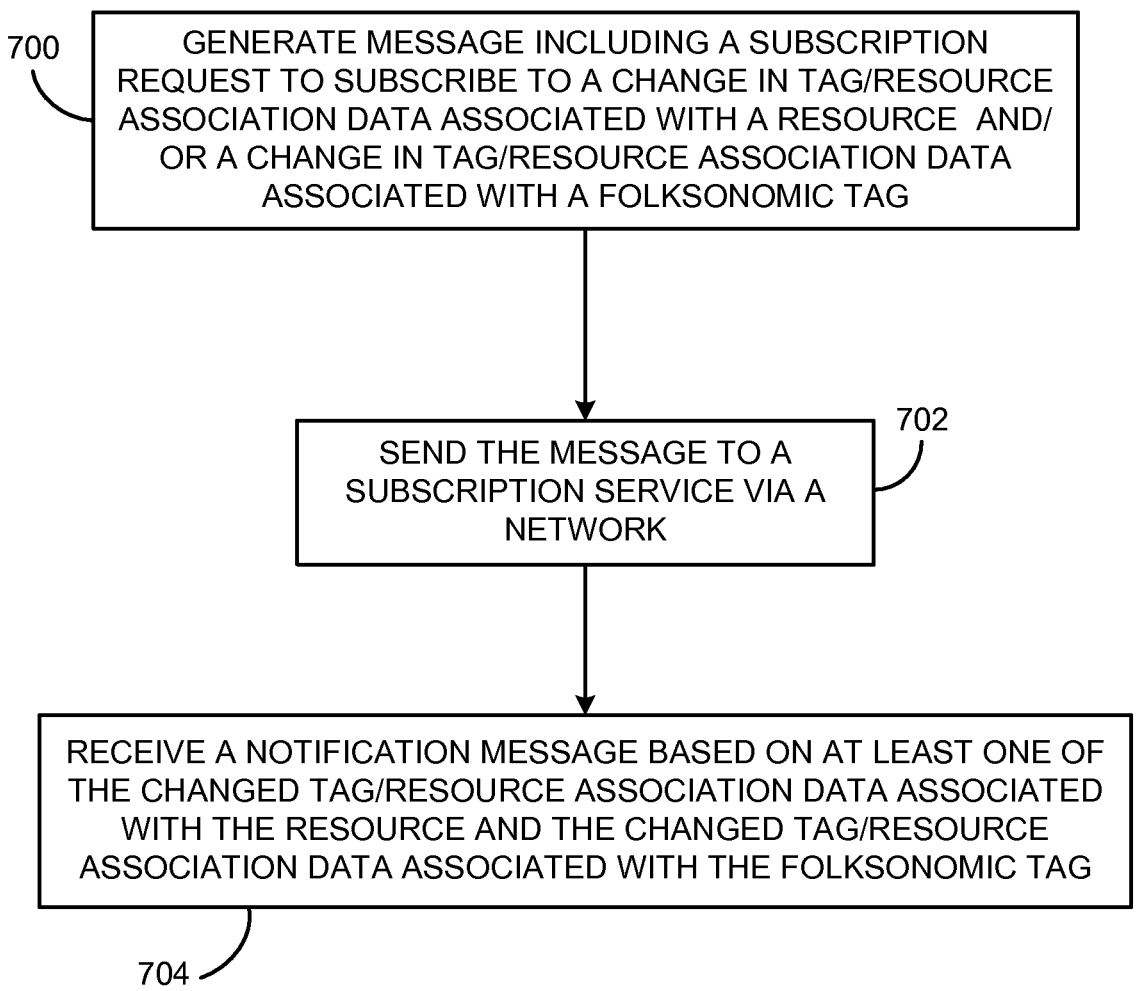
FIG. 7 is a flowchart illustrating a method for managing dynamic associations between folksonomic data and resources according to another exemplary embodiment.

In another aspect of the subject matter disclosed herein, FIG. 7 is a flowchart of a method for managing dynamic associations between folksonomic data and resources from the perspective of the tag/resource association client 220*a*, 220*b* according to another embodiment. Referring again to FIG. 2 and FIG. 7, the method begins when a message is generated that includes a subscription request to at least one of a change in tag/resource association data 310 associated with a resource and a change in tag/resource association data 310 associated with a folksonomic tag (block 700). The subscription request can, in one embodiment, include information identifying at least one of the resource and the folksonomic tag.

In one embodiment, a subscriber can use the resource client control component 222 to provide information relating to a resource and/or the tag client control component 224 to provide information relating to a folksonomic tag. The information can include, in one embodiment, an indication to watch a resource tuple associated with a resource identifier and/or a tag tuple associated with a tag identifier. A resource or tagging agent component 226 receives this information from the resource client control component 222 and/or the tag client control component 224, respectively, and generates the message that includes the subscription request for changes in the tag/resource association data 310 associated with the resource and/or the folksonomic tag. In one embodiment, the message can include information identifying the subscriber as well as a second subscriber associated with a different device 200*b*.

Once generated, the message is sent to the subscription service 320 via the network 110 (block 702). According to one embodiment, the message can be sent using a pub/sub protocol. For example, the agent component 226 can invoke a watcher component (not shown) to send the message to the subscription service 320 over the network 110 via the communication, e.g., pub/sub, protocol layer 240 and a network protocol stack 250. Accordingly, in this manner, the tag/resource association client 220*a* can be a watching entity that watches tag/resource association data 310 associated with at least one of a resource and a folksonomic tag at the subscription service 320. Alternate embodiments can use other communication protocols including proprietary protocols and messaging protocols, such as email protocols, instant messaging (IM) protocols, really-simple-syndication-based (RSS-based) protocols, HTTP based protocols such as simple object access protocol (SOAP), and various remote procedure call protocols.

Once subscribed to changes in the tag/resource association data 310 associated with at least one of the resource and the folksonomic tag, the subscriber can receive a notification message based on at least one of the changed tag/resource association data associated with the resource and the changed tag/resource association data associated with the folksonomic tag (block 704). In addition, the subscriber can receive a directed notification message including changed tag/resource association data associated with at least one of a second resource and a second folksonomic tag pursuant to a directed publish/notify command that identifies the subscriber.

In one embodiment, the notification message is an asynchronous message, that is, it is received without a corresponding request. A notification message, whether asynchronous or synchronous, may be received substantially simultaneously when the change is published. In another exemplary embodiment, the notification message can be received when a subscriber logs in to the subscription service 320 or when a subscriber requests the changed tag/resource association data. In another embodiment, a client can receive the notification message pursuant to a fetch request. For example, the resource client control component 222 and/or the tag client control component 224 can receive an instruction to fetch tag/resource association data 310 associated with at least one of a resource and a folksonomic tag. The agent component 226 receives this instruction from the resource client control component 222 and/or the tag client control component 224, and generates a fetch request and sends it to the subscription service 320 via the network 110. In this manner, the resource client control component 222 and/or the tag client control component 224 can receive a notification message including the current tag/resource association data 310 associated with at least one of a resource and a folksonomic tag pursuant to a fetch request.

Figure 8:
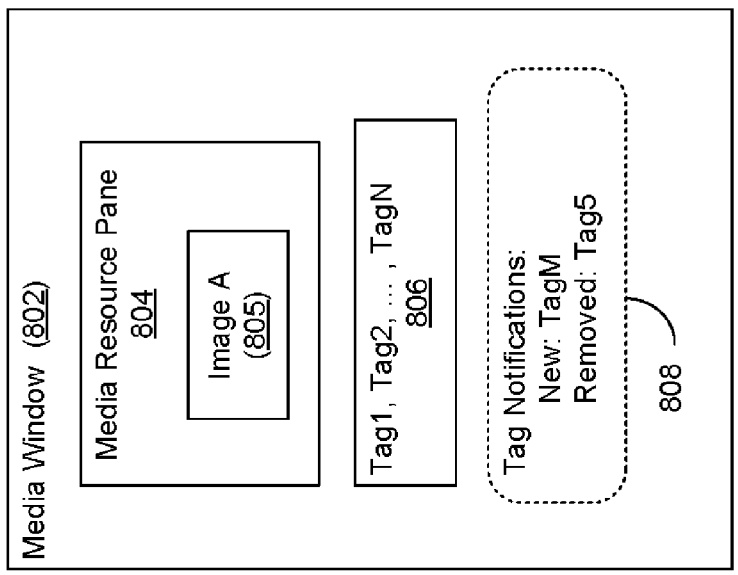
FIG. 8 depicts an exemplary user interface according to one embodiment.

When the notification message is received, the changed tag/resource association data in the notification message can be presented to a user via a user interface. For example, FIG. 8 depicts a user interface 800 including a media window 802 for displaying a media resource, such as an image 805, according to one embodiment. The media resource 805 in the media window 802 can be presented in a media resource pane 804. A tag panel 806 can present tags associated with the media resource 805. In response to receiving the notification message, a tag notification message window 808 can present the changed tag/resource association data 310 in the notification message. In this example, the changed tag/resource association data 310 includes information indicating that a tag, "TagM," has been associated with the media resource 805 presented in the media resource pane 804, and that an association between a second tag, "Tag5," and the media resource 805 has been removed.

Figure 9:
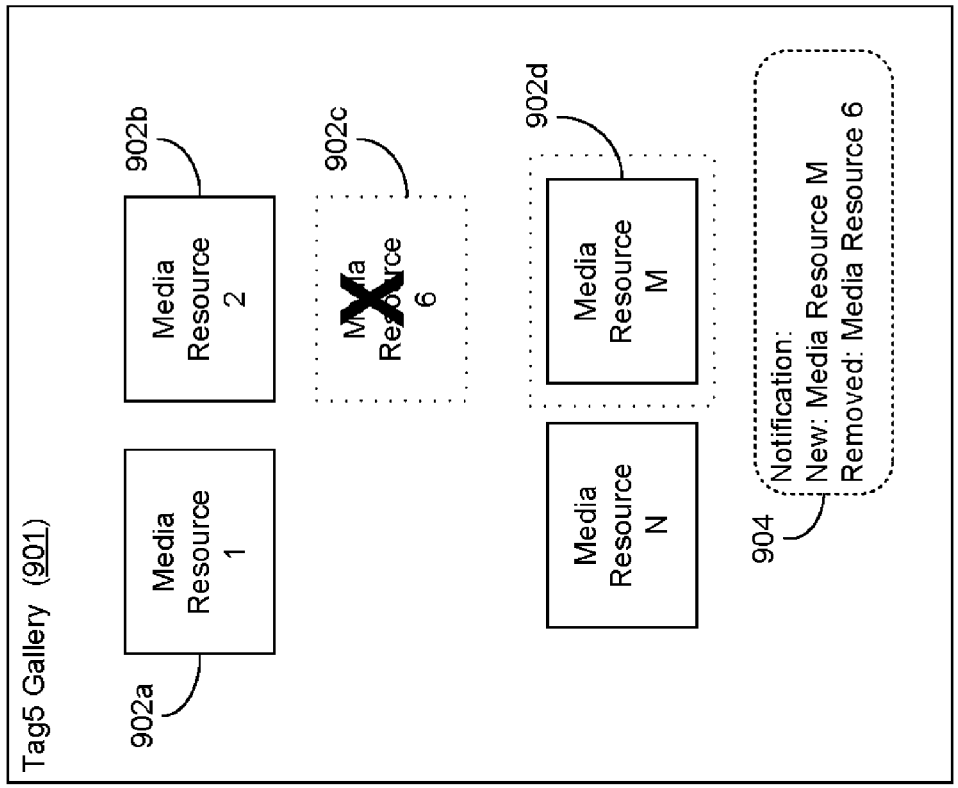
FIG. 9 depicts another user interface according to another embodiment.

In another embodiment, shown in FIG. 9, a user interface 900 includes a "Tag5 Gallery" window 901 for displaying media resources 902*a*-902*d* associated with a tag, "Tag5." Presented in the window 901 are a plurality of media resources 902*a*-902*d* that have been associated with the tag, "Tag5." In response to receiving the notification message, a notifications message window 904 can present the changed tag/resource association data 310 in the notification message. In this example, the notification message includes information indicating that a media resource, "Media Resource M," has been associated with Tag5, and that an association between Tag5 and a media resource, "Media Resource 6," has been removed. In one embodiment, the Tag5 Gallery window 901 can be updated by removing the presentation of Media Resource 6, as indicated by the "X" over Media Resource 6 (902*c*), and adding a representation of the Media Resource M (902*d*) to the presentation, as indicated by the dotted outline around Media Resource M (902*d*).

Through aspects of the embodiments described, dynamic associations between folksonomic tags and resources can be managed using a subscription service 320. It should be understood that the various components illustrated in the figures represent logical components that are configured to perform the functionality described herein and may be implemented in software, hardware, or a combination of the two. Moreover, some or all of these logical components may be combined and some may be omitted altogether while still achieving the functionality described herein.

To facilitate an understanding of exemplary embodiments, many aspects are described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both.

Moreover, the sequences of actions can be embodied in any computer-readable medium for use by or in connection with an instruction execution system, apparatus, or device, such as a computer-based system, processor containing system, or other system that can fetch the instructions from a computer-readable medium and execute the instructions.

As used herein, a "computer-readable medium" can include one or more of any suitable media for storing the executable instructions of a computer program in one or more of an electronic, magnetic, optical, electromagnetic, and infrared form, such that the instruction execution system, apparatus, or device can read (or fetch) the instructions from the computer readable medium and execute the instructions for carrying out the described methods. A non-exhaustive list of conventional exemplary computer-readable medium includes: a portable computer diskette, a random access memory (RAM), a read-only memory (ROM), an erasable programmable read-only memory (EPROM or Flash memory), optical storage devices including a portable compact disc read-only memory (CDROM) and the like.

Thus, the subject matter described herein can be embodied in many different forms, and all such forms are contemplated to be within the scope of what is claimed.

It will be understood that various details of the invention may be changed without departing from the scope of the claimed subject matter. Furthermore, the foregoing description is for the purpose of illustration only, and not for the purpose of limitation, as the scope of protection sought is defined by the claims as set forth hereinafter together with any equivalents thereof entitled to.

What is claimed is:

1. A method for managing dynamic associations between folksonomic data and resources, the method comprising:
    receiving from a subscriber a subscription request to establish at least one of a first subscription to tag/resource association data associated with a resource and a second subscription to tag/resource association data associated with a folksonomic tag, wherein the folksonomic tag is unstructured metadata that includes a user-defined character string;
    establishing at least one of the first subscription and the second subscription;
    determining a change to the tag/resource association data associated with at least one of the folksonomic tag and the resource identified in the subscription request;
    generating a notification message including at least one of an identifier of the folksonomic tag and an identifier of the resource in response to determining the change to the tag/resource association data associated with at least one of the folksonomic tag and the resource; and
    sending the notification message to the subscriber pursuant to at least one of the first subscription and the second subscription,
    wherein at least one of the preceding actions is performed on at least one processor.

2. The method of claim 1 further including sending a second notification message including at least one of the identifier of the folksonomic tag and the identifier of the resource to a recipient identified in a change message including a request to change the tag/resource association data.

3. The method of claim 2 wherein the change message includes at least one of a tag tuple including tag/resource association data associated with the folksonomic tag and a resource tuple including tag/resource association data associated with the resource.

4. The method of claim 2 wherein at least one of receiving the subscription request, receiving the change message, sending the notification message, and sending the second notification message comprises using at least one of an electronic mail protocol, an instant messaging protocol, RSS-based protocols, HTTP-based protocols, a remote procedure call protocol, and a publish/subscribe protocol to at least one of receive the subscription request, receive the change message, send the notification message, and send the second notification message.

5. The method of claim 1 wherein generating the notification message comprises using at least one of a tag tuple including tag/resource association data associated with the folksonomic tag and a resource tuple including tag/resource association data associated with the resource, wherein the tag/resource association data associated with the folksonomic tag includes information relating to at least one resource associated with the folksonomic tag and the tag/resource association data associated with the resource includes information relating to at least one folksonomic tag associated with the resource.

6. The method of claim 1 further comprising storing at least one of the tag/resource association data associated with the folksonomic tag in a tag tuple and the tag/resource association data associated with the resource in a resource tuple, wherein the tag/resource association data associated with the folksonomic tag includes information relating to at least one resource associated with the folksonomic tag and the tag/resource association data associated with the resource includes information relating to at least one folksonomic tag associated with the resource.

7. The method of claim 6 further comprising processing a change message including a request to change the tag/resource association data by updating at least one of the tag tuple and the resource tuple.

8. A method for managing dynamic associations between folksonomic data and resources, the method comprising:
    generating a message including a subscription request to subscribe to at least one of a change in tag/resource association data associated with a resource and a change in tag/resource association data associated with a folksonomic tag, wherein the folksonomic tag is unstructured metadata that includes a user-defined character string and the request includes information identifying at least one of the resource and the folksonomic tag;
    sending the message to a subscription service via a network; and
    receiving, pursuant to the subscription request, a notification message based on at least one of changed tag/resource association data associated with the resource and changed tag/resource association data associated with the folksonomic tag,
    wherein at least one of the preceding actions is performed on at least one processor.

9. The method of claim 8 further comprising receiving a second notification message, pursuant to a directed publish/notify command, based on at least one of changed tag/resource association data associated with a second resource and changed tag/resource association data associated with a second folksonomic tag.

10. The method of claim 8 wherein sending the message comprises using at least one of an electronic mail protocol, an instant messaging protocol, RSS-based protocols, HTTP-based protocols, a remote procedure call protocol, and a publish/subscribe protocol.

11. The method of claim 8 wherein prior to generating the message, the method includes:
receiving an indication to watch at least one of a tag tuple and a resource tuple, wherein the tag tuple is provided for associating folksonomic tag information to at least one resource and the resource tuple is provided for associating resource information to at least one folksonomic tag.

12. The method of claim 8 further comprising:
sending a fetch request to fetch at least one of the tag/resource association data associated with the resource and the tag/resource association data associated with the folksonomic tag to the subscription service via the network; and
receiving, pursuant to the fetch request, another notification message including at least one of the tag/resource association data associated with the resource, and the tag/resource association data associated with the folksonomic tag.

13. A system for managing dynamic associations between folksonomic data and resources, the system comprising system components including:
a network protocol stack component configured for receiving and sending information over a network; and
a subscription service communicatively coupled to the network stack component, the subscription service comprising:
a subscription handler component configured for receiving from a subscriber via the network a subscription request to establish at least one of a first subscription to tag/resource association data associated with a resource and a second subscription to tag/resource association data associated with a folksonomic tag, wherein the folksonomic tag is unstructured metadata that includes a user-defined character string, and configured for establishing at least one of the first subscription and the second subscription;
an association handler component configured for determining a change to the tag/resource association data associated with at least one of the folksonomic tag and the resource identified in the subscription request; and
a notification handler component configured for generating a notification message including at least one of an identifier of the folksonomic tag and an identifier of the resource in response to determining the change to the tag/resource association data associated with at least one of the folksonomic tag and the resource, and for sending the notification message via the network to the subscriber pursuant to at least one of the first subscription and the second subscription,
wherein at least one of the system components includes at least one electronic Hardware component.

14. The system of claim 13 wherein the notification handler component is further configured for sending a second notification message including at least one of the identifier of the folksonomic tag and the identifier of the resource via the network to a recipient identified in a change message including a request to change the tag/resource association data.

15. The system of claim 14 wherein the change message includes at least one of a tag tuple including tag/resource association data associated with the folksonomic tag and a resource tuple including tag/resource association data associated with the resource.

16. The system of claim 14 wherein at least one of the association handler component and the notification handler component is further configured to receive at least one of the subscription request the change message and to send notification messages, respectively, using at least one of an electronic mail protocol, an instant messaging protocol, RSS-based protocols, HTTP-based protocols, a remote procedure call protocol, and a publish/subscribe protocol.

17. The system of claim 13 wherein the notification handler component is configured for generating the notification message by using at least one of a tag tuple including tag/resource association data associated with the folksonomic tag and a resource tuple including tag/resource association data associated with the resource, wherein the tag/resource association data associated with the folksonomic tag includes information relating to at least one resource associated with the folksonomic tag and the tag/resource association data associated with the resource includes information relating to at least one folksonomic tag associated with the resource.

18. The system of claim 13 wherein the association handler component is further configured for storing at least one of the tag/resource association data associated with the folksonomic tag in a tag tuple and the tag/resource association data associated with the resource in a resource tuple, wherein the tag/resource association data associated with the folksonomic tag includes information relating to at least one resource associated with the folksonomic tag and the tag/resource association data associated with the resource includes information relating to at least one folksonomic tag associated with the resource.

19. The system of claim 18 wherein the association handler component is further configured for processing a change message including a request to change the tag/resource association data by updating at least one of the tag tuple and the resource tuple.

20. A system for managing dynamic associations between folksonomic data and resources, the system comprising:
means for receiving from a subscriber via a network a subscription request to establish at least one of a first subscription to tag/resource association data associated with a resource and a second subscription to tag/resource association data associated with a folksonomic tag, wherein the folksonomic tag is unstructured metadata that includes a user-defined character string, and for establishing at least one of the first subscription and the second subscription;
means for determining a change to the tag/resource association data associated with at least one of the folksonomic tag and the resource identified in the subscription request; and
means for generating a notification message including at least one of an identifier of the folksonomic tag and an identifier of the resource in response to determining the change to the tag/resource association data associated with at least one of the folksonomic tag and the resource, and for sending the notification message via the network to the subscriber pursuant to at least one of the first subscription and the second subscription,
wherein at least one of the means includes at least one electronic hardware component.

21. A computer readable medium containing a computer program, executable by a machine, for managing dynamic associations between folksonomic data and resources, the computer program comprising executable instructions for:
receiving from a subscriber a subscription request to establish at least one of a first subscription to tag/resource association data associated with a resource and a second subscription to tag/resource association data associated with a folksonomic tag, wherein the folksonomic tag is unstructured metadata that includes a user-defined character string;

establishing at least one of the first subscription and the second subscription;

determining a change to the tag/resource association data associated with at least one of the folksonomic tag and the resource identified in the subscription request;

generating a notification message including at least one of an identifier of the folksonomic tag and an identifier of the resource in response to determining the change to the tag/resource association data associated with at least one of the folksonomic tag and the resource; and sending the notification message to the subscriber pursuant to at least one of the first subscription and the second subscription.

22. The computer readable medium of claim 21 wherein the program further includes instructions for:

sending a second notification message including at least one of the identifier Of the folksonomic tag and the identifier of the resource to a recipient identified in a change message including a request to change the tag/resource association data.

23. The computer readable medium of claim 22 wherein instructions for at least one of receiving the subscription request, receiving the change message, sending the notification message, and sending the second notification message comprise instructions for using at least one of an electronic mail protocol, an instant messaging protocol, RSS-based protocols, HTTP-based protocols, a remote procedure call protocol, and a publish/subscribe protocol to at least one of receive the subscription request, receive the change message, send the notification message, and send the second notification message.

24. The computer readable medium of claim 21 further comprising instructions for generating the notification message using at least one of a tag tuple including tag/resource association data associated with the folksonomic tag and a resource tuple including tag/resource association data associated with the resource, wherein the tag/resource association data associated with the folksonomic tag includes information relating to at least one resource associated with the folksonomic tag and the tag/resource association data associated with the resource includes information relating to at least one folksonomic tag associated with the resource.

25. The computer readable medium of claim 21 wherein the program further includes instructions for storing at least one of the tag/resource association data associated with the folksonomic tag in a tag tuple and the tag/resource association data associated with the resource in a resource tuple, wherein the tag/resource association data associated with the folksonomic tag includes information relating to at least one resource associated with the folksonomic tag and the tag/resource association data associated with the resource includes information relating to at least one folksonomic tag associated with the resource.

26. The computer readable medium of claim 25 further including instructions for processing a change message including a request to change the tag/resource association data by updating at least one of the tag tuple and the resource tuple after receiving the second request to change the tag/resource association data.

27. A computer readable medium containing a computer program, executable by a machine, for managing dynamic associations between folksonomic data and resources, the computer program comprising executable instructions for:

generating a message including a subscription request to subscribe to at least one of a change in tag/resource association data associated with a resource and a change in tag/resource association data associated with a folksonomic tag, wherein the folksonomic tag is unstructured metadata that includes a user-defined character string and the request includes information identifying at least one of the resource and the folksonomic tag;

sending the message to a subscription service via a network; and receiving, pursuant to the subscription request, a notification message based on at least one of changed tag/resource association data associated with the resource and changed tag/resource association data associated with the folksonomic tag.

\* \* \* \* \*